United States Patent [19]

Iso et al.

[11] Patent Number: 5,489,995
[45] Date of Patent: Feb. 6, 1996

[54] CONTACT TYPE IMAGE SENSOR, PRODUCING METHOD OF THE SAME, AND INFORMATION PROCESSING APPARATUS

[75] Inventors: Toshimitsu Iso, Atsugi; Kenji Nagata, Kawasaki, both of Japan

[73] Assignee: Canon Kabushiki Kaisha, Tokyo, Japan

[21] Appl. No.: 267,916

[22] Filed: Jul. 6, 1994

Related U.S. Application Data

[63] Continuation of Ser. No. 73,481, Jun. 9, 1993, abandoned.

[30] Foreign Application Priority Data

Jun. 11, 1992 [JP] Japan ................................. 4-176048
Jul. 2, 1992 [JP] Japan ................................. 4-175501

[51] Int. Cl.⁶ ................................................. H04N 1/04
[52] U.S. Cl. ........................ 358/483; 358/474; 358/496
[58] Field of Search ................................. 358/483, 482, 358/474, 471, 400, 496, 498, 475; 250/208.1

[56] References Cited

U.S. PATENT DOCUMENTS

| | | | |
|---|---|---|---|
| 4,461,956 | 7/1984 | Hatanaka et al. | 250/578 |
| 4,680,644 | 7/1987 | Shirato et al. | 358/474 |
| 4,686,554 | 8/1987 | Ohmi et al. | 357/30 |
| 4,723,129 | 2/1988 | Endo et al. | 346/1.1 |
| 4,740,796 | 4/1988 | Endo et al. | 346/1.1 |
| 4,791,469 | 12/1988 | Ohmi et al. | 357/30 |
| 4,792,670 | 12/1988 | Fukaya et al. | 250/211 R |
| 4,810,896 | 3/1989 | Tanaka et al. | 250/578 |
| 4,839,730 | 6/1989 | Shirakoshi et al. | 358/483 |
| 4,873,579 | 10/1989 | Kubota et al. | 358/471 |
| 4,920,431 | 4/1990 | Ogura et al. | 358/496 |
| 5,187,596 | 2/1993 | Hwang | 358/483 |
| 5,254,847 | 10/1993 | Hata et al. | 250/208.1 |

FOREIGN PATENT DOCUMENTS

| | | | |
|---|---|---|---|
| 0365312 | 4/1990 | European Pat. Off. | H01L 31/18 |
| 0457623 | 11/1991 | European Pat. Off. | H04N 1/028 |
| 0465768 | 1/1992 | European Pat. Off. | H04N 1/028 |
| 0520430 | 12/1992 | European Pat. Off. | |
| 3716809 | 11/1987 | Germany | H04N 1/04 |
| 63-247052 | 10/1988 | Japan | B41J 3/04 |

*Primary Examiner*—Edward L. Coles, Sr.
*Assistant Examiner*—Fan Lee
*Attorney, Agent, or Firm*—Fitzpatrick, Cella, Harper & Scinto

[57] ABSTRACT

A contact type image sensor, which includes a transparent member which can contact an original to be read, a light source for radiating light onto the original via the transparent member, a sensor for receiving light reflected by the original, an imaging element for imaging the reflected light on a light-receiving portion of the sensor, and a support unit for supporting theسنsor, the imaging element, the transparent member, and the light source. The imaging element and the light source are supported by the transparent member and the support unit.

27 Claims, 13 Drawing Sheets

CONTACT TYPE IMAGE SENSOR, PRODUCING METHOD OF THE SAME, AND INFORMATION PROCESSING APPARATUS

This application is a continuation of application Ser. No. 08/073,481 filed Jun 9, 1993, now abandoned.

BACKGROUND OF THE INVENTION

1. Field of the Invention

The present invention relates to a contact type image sensor used in an image information processing apparatus such as a facsimile apparatus, an image reader, a copying machine, or the like, and a producing method of the same and, more particularly, to a structure of a support member of the image sensor.

2. Related Background Art

Conventionally, a contact type image sensor is known. The contact type image sensor has a support member for supporting a sensor array for performing photoelectric conversion, an imaging element for imaging light reflected by an original on the sensor array, a member for defining a reading surface of the original, and a light source for illuminating the original.

Such an image sensor is described in U.S. Pat. No. 4,920,431 "Image Reading Apparatus with Jam-Prevention Feature" (inventors: Ogura et al.), U.S. Pat. No. 4,680,644 "Method and Apparatus for Reading an Image" (inventors: Shirato et al.), U.S. Pat. No. 4,792,670 "Method of Manufacturing Photosensors" (inventors: Fukaya et al.), and the like.

FIG. 1 is a perspective view showing the outer appearance of a conventional contact type image sensor, and FIG. 2 is a sectional view showing the internal structure taken along a line A—A' in FIG. 1.

As shown in FIGS. 1 and 2, the conventional contact type image sensor is constituted by mounting a sensor 8, including an array of a plurality of pixels, for performing photoelectric conversion, a sensor board 9 mounted with a protection film 10 for protecting the sensor 8, a light-emitting diode array 6 as a light source for radiating light onto an original 13 to be read, a lens array 7 as a lens for imaging an image of the original to be read on a light-receiving portion of the sensor 8, and a transparent member 4 serving as a reading surface on a first frame 1 as a support means.

The first frame 1 is formed with a slit 11 over almost the total length except for the two ends in the longitudinal direction for the purpose of guiding light from the lens array 7 to the light-receiving portion of the sensor 8. For this reason, the sectional shape of the first frame 1 is divided into regions 1-a and 1-b, as shown in FIG. 2.

As a means for attaching components to predetermined positions of the frame 1, a second frame 2 for attaching the sensor board 9, fixing screws 3 for attaching the lens array 7, and an adhesive, a double-sided tape, a screw, or the like (not shown) for attaching the light-emitting diode array 6 are used.

However, in the prior art, the following problems remain unsolved.

(Problem 1 . . . Attaching of Lens Array)

FIGS. 3 and 4 are plan views when viewed from a direction VA in FIG. 1, and FIG. 5 is a sectional view taken along a line B—B in FIG. 4. The same reference numerals in these figures denote the same parts as in FIGS. 1 and 2.

(1) In the prior art, since the lens array 7 is attached to the first frame 1 by the fixing screws 3, the central portion, in the longitudinal direction, of the first frame 1 is deformed, as shown in FIG. 4, and outer dimensions cannot be maintained.

(2) As shown in the sectional view of FIG. 5, since a gap t is widened, stray light 12 is undesirably incident on the light-receiving portion of the sensor 8, and influences the sensor output.

(3) Since a space is formed between the transparent member 4 and the lens array 7, dust particles may enter this space. If dust particles are present on the rear surface of the transparent member 4 along the optical axis of the lens array 7, they may adversely affect the sensor output.

FIGS. 6 and 7 show the sensor outputs including the influence of the dust particles 60 and 70, respectively. Both a black and white dust particles as large as one pixel influence the sensor output.

Reference numbers 61 and 62 in FIGS. 6 and 7 represent light output and dark output, respectively. Reference number 63 represents a phenomenon of a white dust particle. Reference number 71 represents a phenomenon of a black dust particle.

(4) Since the lens array 7 must be fixed at a position determined by focus adjustment, the focus adjustment operation, and a jig for holding the lens array 7 are required, resulting in cumbersome assembling processes.

(Problem 2 . . . Attaching of Light Source)

In addition to problem 1, attaching of the light source suffers from the following problems.

Conventionally, since the light-emitting diode array 6 as a light source for illuminating an original is attached to the first frame 1 using an adhesive, a double-sided tape, a screw, or the like, the following problems remain unsolved.

(1) When an adhesive is used, a special means for holding the light-emitting diode array 7 until the adhesive is hardened is required. For this reason, assembling processes are cumbersome, and the assembling time is prolonged.

(2) When a double-sided tape is used, dust particles are easily generated from and attached to the end portions of the double-sided tape.

(3) When a screw is used, a process for working the first frame 1 to form a tap for receiving the screw is required, and parts cost is increased by the screw.

In addition to the above-mentioned problems of the conventional image sensor, the following problems also remain unsolved.

FIG. 8 is a perspective view showing an outer appearance of a conventional image sensor. FIG. 8 illustrates a frame 201 as a support member, a glass plate 205 as a transparent member, which can contact an original, and defines a reading surface, and side plates 210. Many optical sensor elements (pixels) are aligned along a longitudinal (main-scanning) direction DM of the support member, and a widthwise direction DS of the support member is defined as the sub-scanning direction.

FIG. 9 is a sectional view taken along a line AA—AA' in FIG. 8. An imaging element 207 is arranged in a first space 201A of the support member 201, and a light source 209 is arranged in a second space 201B. The first and second spaces communicate with each other. A sensor array 203 is arranged on a board 204, and is covered with a protection layer 233. The sensor array 203 is arranged to face a third space 201C between the support member (frame) 201 and a second frame 202.

Such an image sensor is assembled as follows. More specifically, the light source 209 is fixed on an attaching surface 219 of the frame 201 using an adhesive or a screw, and the board 204 provided with the sensor array 203 is fixed to the frame 201 using the second frame 202. The imaging element 207 is inserted in the space 201A and is fixed using screws 217, the glass plate 205 is fixed, and the side plates 210 are attached.

FIG. 10 is a sectional view showing still another prior art.

The imaging element 207, the light source 209, and the sensor array 203 are attached to the support member 201 of the image sensor shown in FIG. 10 as in the image sensor shown in FIG. 9, and an upper portion of the sensor array 203 is covered with a cover 202. In this arrangement, a planar member for defining an original surface is adopted in place of the glass plate.

However, the above-mentioned prior arts suffer from technical problems to be solved. When the above-mentioned components are attached, the light source 209 is attached from a position above the frame 201, the lens 207 is attached from positions above and aside the frame 201, and the sensor array 203 is attached from a position below the frame 201. For this reason, the attaching work is cumbersome, and workability is poor. In an attaching work, since a worker attaches the light source, the lens, and the sensor array while turning the frame 201 upside down on a work table, dust particles often enter the spaces 201A, 201B, and 201C from the surface of the work table.

The optical positions of the components are determined by only the frame 201. However, the working technique of aluminum as a material of the frame cannot provide sufficient positioning precision, and this leads to further difficulties in positioning.

SUMMARY OF THE INVENTION

It is an object of the present invention to provide a contact type image sensor, which has a structure allowing easy attaching works of components.

It is another object of the present invention to provide a contact type image sensor, which improves the attaching structure of a lens and/or a light source to a support means, thereby preventing a deformation upon attaching, stray light, and an adverse effect caused by dust particles, facilitating assembling processes, and reducing cost by decreasing the number of parts.

It is still another object of the present invention to provide a contact type image sensor which has a structure allowing easy and precise positioning of components to a support member.

It is still another object of the present invention to provide a producing method of the above-mentioned contact type image sensor, and an information processing apparatus using the contact type image sensor.

In order to achieve the above objects, according to the present invention, there is provided a contact type image sensor, which comprises a transparent member which can contact an original to be read, a light source for radiating light onto the original via the transparent member, a sensor for receiving light reflected by the original, a lens for imaging the reflected light on a light-receiving portion of the sensor, and support means for supporting the sensor, the lens, the transparent member, and the light source, wherein at least one of the lens and the light source is supported by the transparent member and the support means.

The transparent member and the lens are supported in a tight contact state without forming any gap therebetween.

The support means is pre-formed with a support surface for supporting the lens at a focal point position where the lens images the reflected light on the light-receiving portion of the sensor.

There is also provided an information processing apparatus comprising the above-mentioned contact type image sensor, and means for supporting an original on an original reading surface of the sensor.

According to the present invention, in order to solve the above-mentioned problems, since the lens and the light source are supported by the transparent member and the support means as a means for attaching the lens and the light source to the support means, the following effects can be provided:

(1) the support means can be prevented from being deformed;

(2) the sensor output can be prevented from being adversely affected by dust particles on the rear surface of the transparent member;

(3) the focus adjustment operation of the lens can be simplified; and (4) the attaching work of the lens and the light source to the support means can be simplified.

In order to achieve the above objects, according to the present invention, there is also provided a contact type image sensor, which comprises a support member for supporting a sensor array for performing photoelectric conversion, an imaging element for imaging light reflected by an original on the sensor array, a transparent member for defining a reading surface of the original, and a light source for illuminating the original, wherein the support member has a first support member having positioning portions for determining positions of the light source, the imaging element, and the sensor array, and a second support member having two opposing portions extending in a longitudinal direction of the support member, and crossing portions crossing the opposing portions, the second support member clamping the imaging element by the opposing portions via the first support member, and the first support member and the sensor array being clamped between the transparent member and the crossing portions.

Furthermore, in order to achieve the above objects, according to the present invention, there is provided an image information processing apparatus having a contact type image sensor which comprises a support member for supporting a sensor array for performing photoelectric conversion, an imaging element for imaging light reflected by an original on the sensor array, a transparent member for defining a reading surface of the original, and a light source for illuminating the original, and in which the support member has a first support member having positioning portions for determining positions of the light source, the imaging element, and the sensor array, and a second support member having two opposing portions extending in a longitudinal direction of the support member, and crossing portions crossing the opposing portions, the second support member clamping the imaging element by the opposing portions via the first support member, and the first support member and the sensor array being clamped between the transparent.member and the crossing portions, wherein attaching portions are provided to the second support member, and the sensor is attached to an apparatus main body by the attaching portions.

Moreover, in order to achieve the above objects, according to the present invention, there is provided a method of producing a contact type image sensor which comprises a support member for supporting a sensor array for performing photoelectric conversion, an imaging element for imaging light reflected by an original on the sensor array, a transparent member for defining a reading surface of the original, and a light source for illuminating the original, comprising the steps of: fitting a first support member having positioning portions for determining positions of the light source, the imaging element, and the sensor array in a second support member having two opposing portions extending in a longitudinal direction of the second support member, and crossing portions crossing the opposing portions; attaching the light source and the imaging element to the first support member fitted in the second support member; and arranging and fixing the transparent member on the light source and the imaging element attached to the first support member.

According to the present invention, since the support member is functionally divided into the first support member requiring high-precision working, and the second support member requiring a high mechanical strength, a low-cost, high-quality image sensor can be provided.

After the first support member is assembled to the second support member, optical members are attached to the first support member in the same direction. Thus, an image sensor which allows easy assembling works and is free from erroneous operations can be provided.

DETAILED DESCRIPTION OF THE PREFERRED EMBODIMENTS

The preferred aspect of the present invention is an arrangement for positioning a light input surface of an imaging element by a transparent member for defining an original reading position, or an arrangement for positioning a light source by the transparent member. More preferably, the light input surface of the imaging element and/or a portion of the light source are/is brought into direct contact with a portion of the surface of the transparent member. Furthermore, it is preferable that a support member is functionally divided into a main precise positioning function and a support function having a sufficient mechanical strength using a first support member, which is deformable and easily allows relatively high-precision working, and a rigid second support member subjected to relatively low-precision working.

The preferred embodiments of the present invention will be described hereinafter. However, the present invention is not limited to these embodiments, and includes an arrangement subjected to replacement of constituting elements to equivalents or changes of materials to be used, and the like as long as the above-mentioned objects are achieved.

(First Embodiment)

Figure 1:
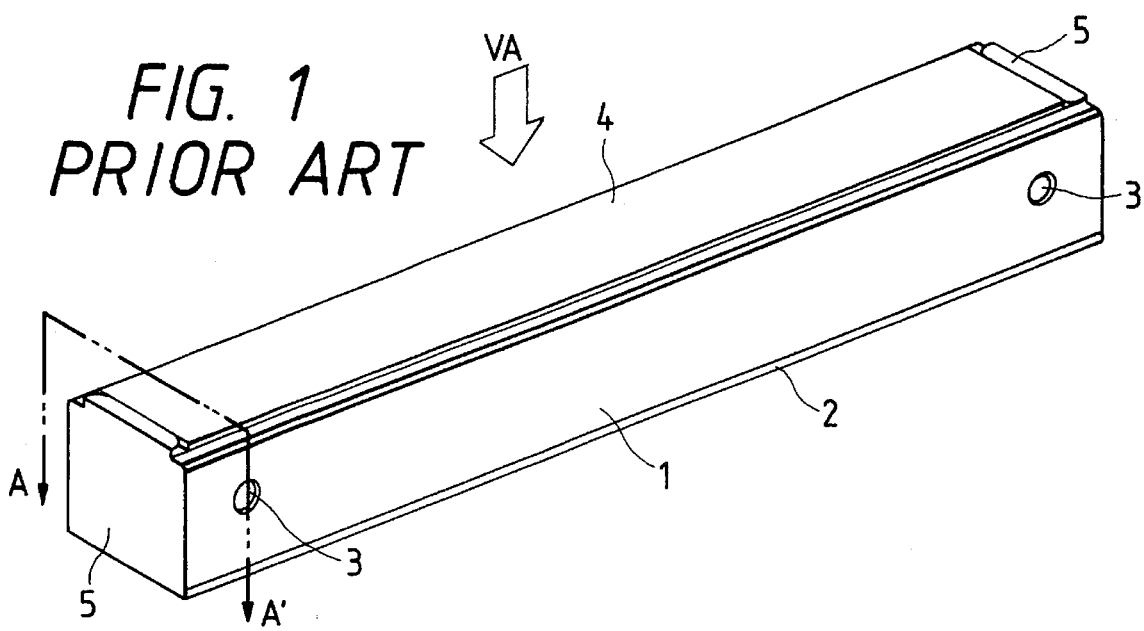
FIG. 1 is a perspective view showing the outer appearance of a conventional contact type image sensor.
Figure 2:
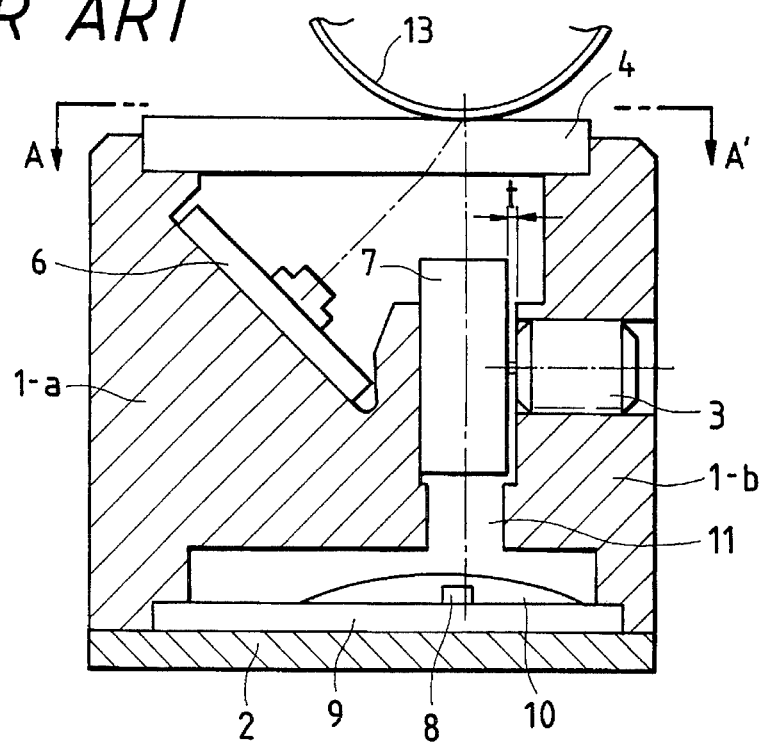
FIG. 2 is a sectional view showing the conventional contact type image sensor.
Figure 3:
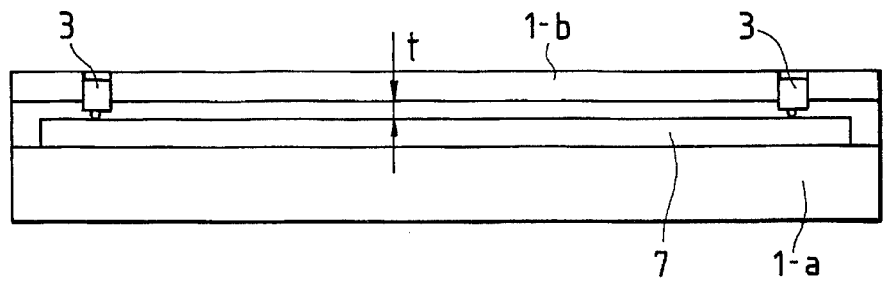
FIG. 3 is a plan view for explaining a conventional lens array attaching method.
Figure 4:
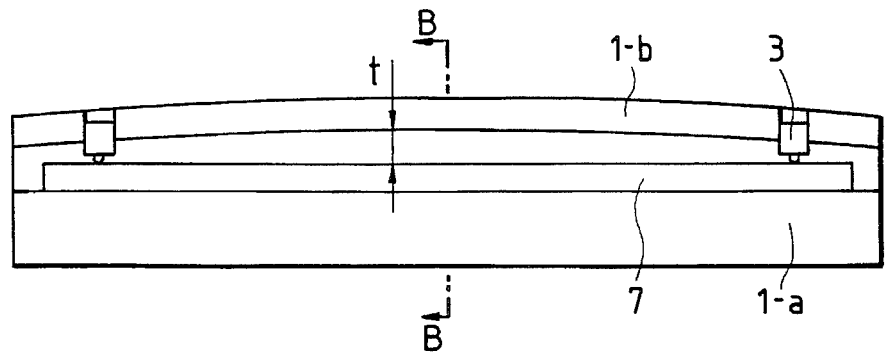
FIG. 4 is a plan view for explaining a frame deformation caused by the conventional lens array attaching method.
Figure 5:
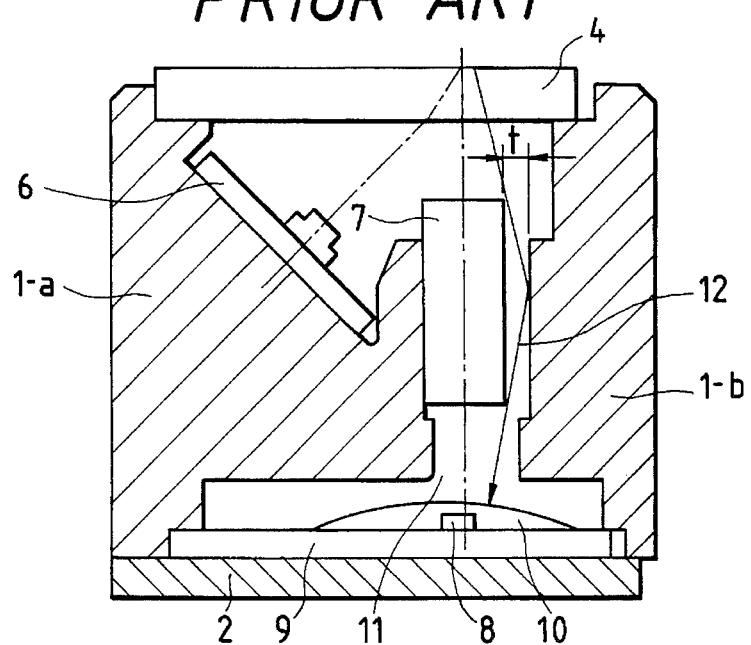
FIG. 5 is a sectional view of the conventional contact type image sensor taken along a line B—B in FIG. 4.
Figure 6:
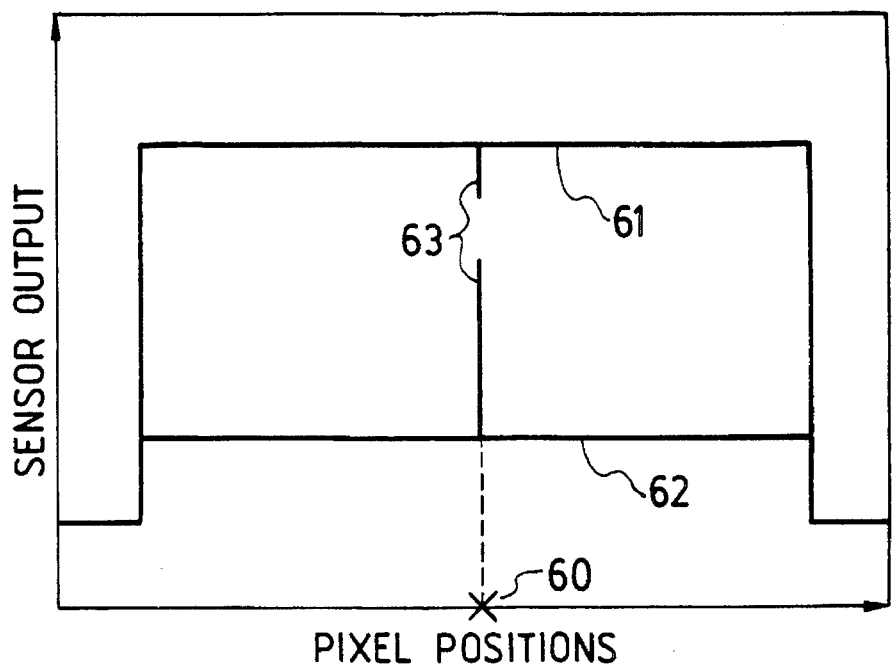
FIG. 6 is a graph showing a sensor output to explain the influence of white dust particles on the sensor output.
Figure 7:
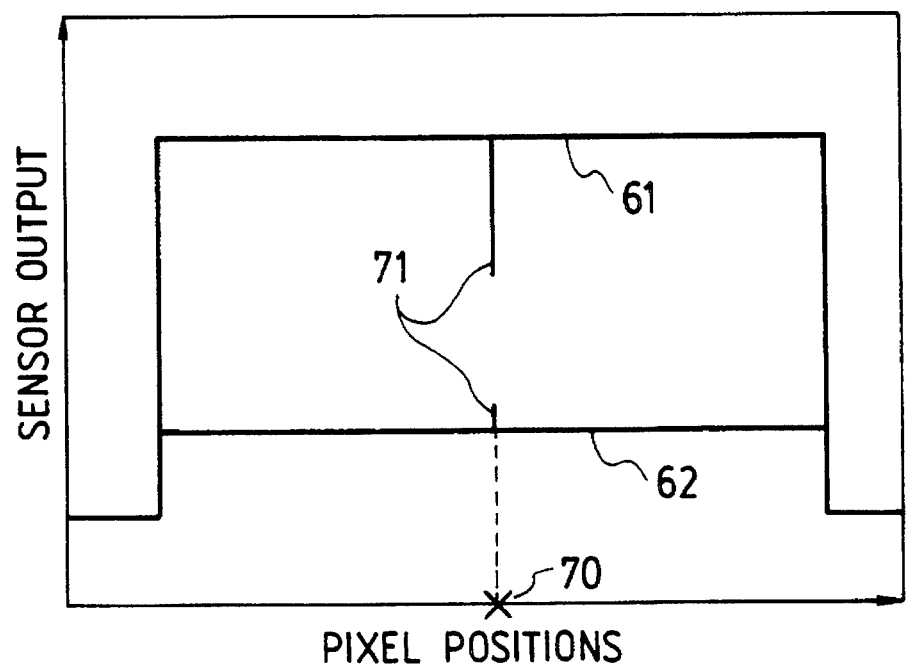
FIG. 7 is a graph showing a sensor output to explain the influence of black dust particles on the sensor output.
Figure 8:
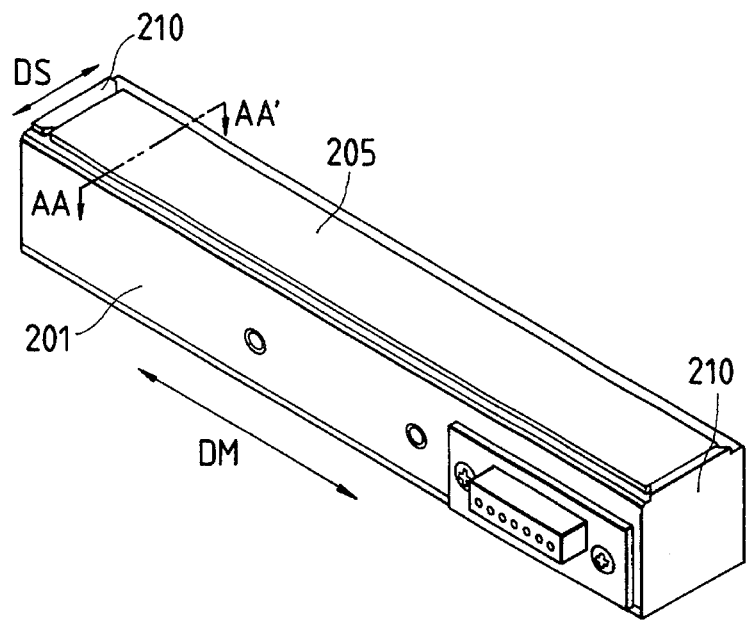
FIG. 8 is a perspective view showing another conventional contact type image sensor.
Figure 9:
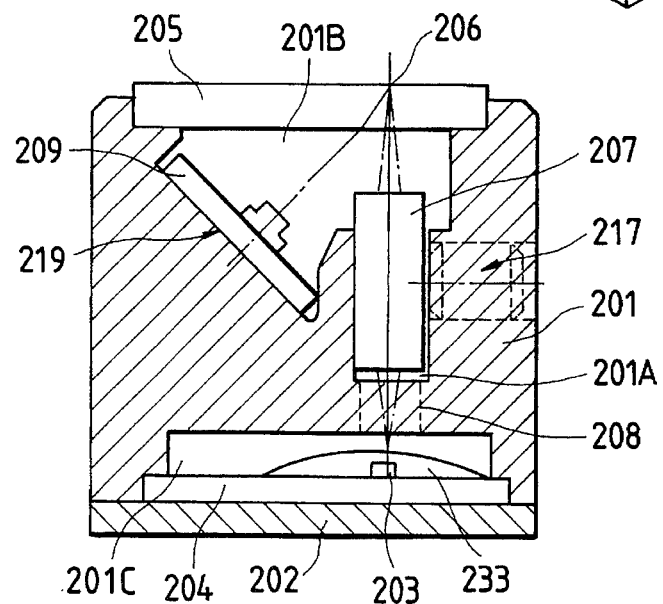
FIG. 9 is a sectional view of the conventional contact type image sensor shown in FIG. 8.
Figure 10:
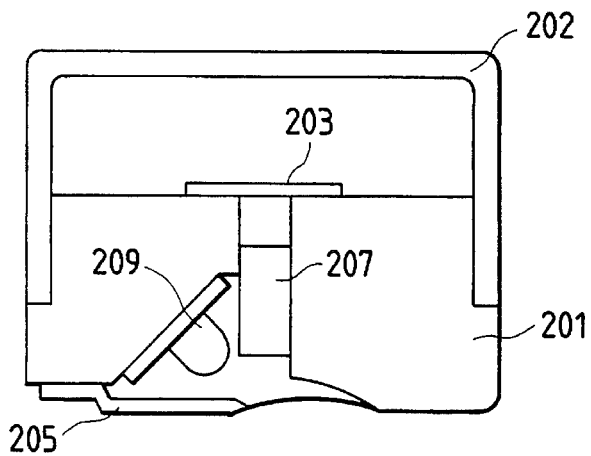
FIG. 10 is a sectional view showing still another conventional contact type image sensor.
Figure 11:
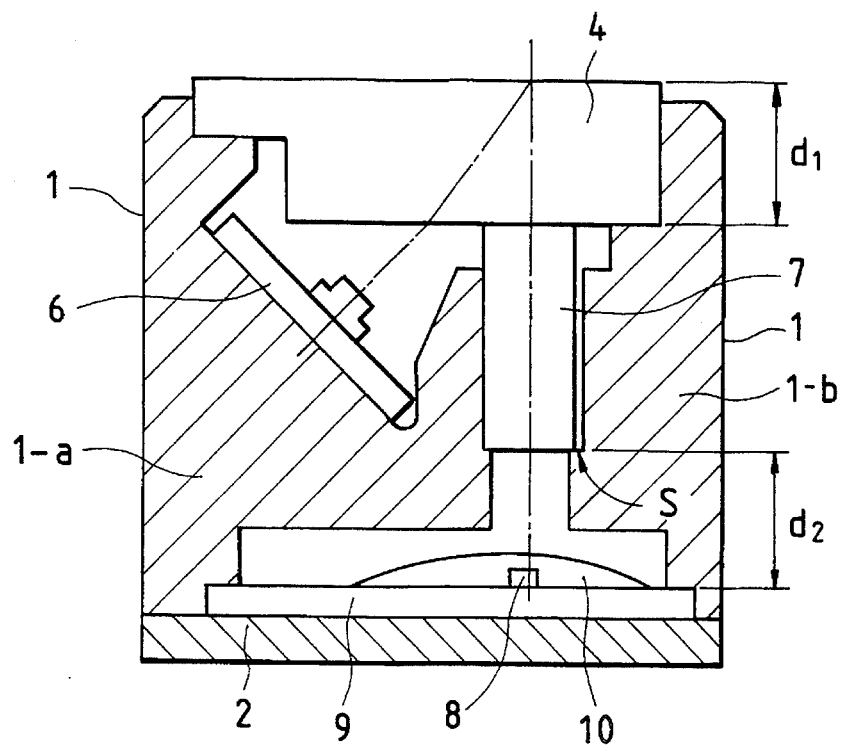
FIG. 11 is a sectional view showing a contact type image sensor according to the first embodiment of the present invention.

FIG. 11 is a sectional view showing an embodiment, which best illustrates the feature of the present invention. In this embodiment, a lens array 7 is supported by a transparent member 4 and a frame 1 as a support means. The same reference numerals in this embodiment denote the same parts as in the prior arts, and a repetitive description thereof will be avoided.

In FIG. 11, the lens array 7 is supported without forming any gaps since it is clamped between the first frame 1 and the transparent member 4.

In this manner, since this embodiment does not require any fixing screws 3, described in the prior art, for attaching the lens array 7, the first frame 1 can be prevented from being deformed.

In this embodiment, light emitted from a light-emitting diode light source 6 is reflected, via the transparent member 4, by an original surface (not shown) placed on the transparent member 4, is transmitted through the transparent member 4 again, and is directly incident on the lens array 7. In this embodiment, since no space allowing entrance of dust particles is present between the transparent member 4 and the lens array 7 unlike in the prior arts, the sensor output is free from the influence of dust particles.

Figure 12:
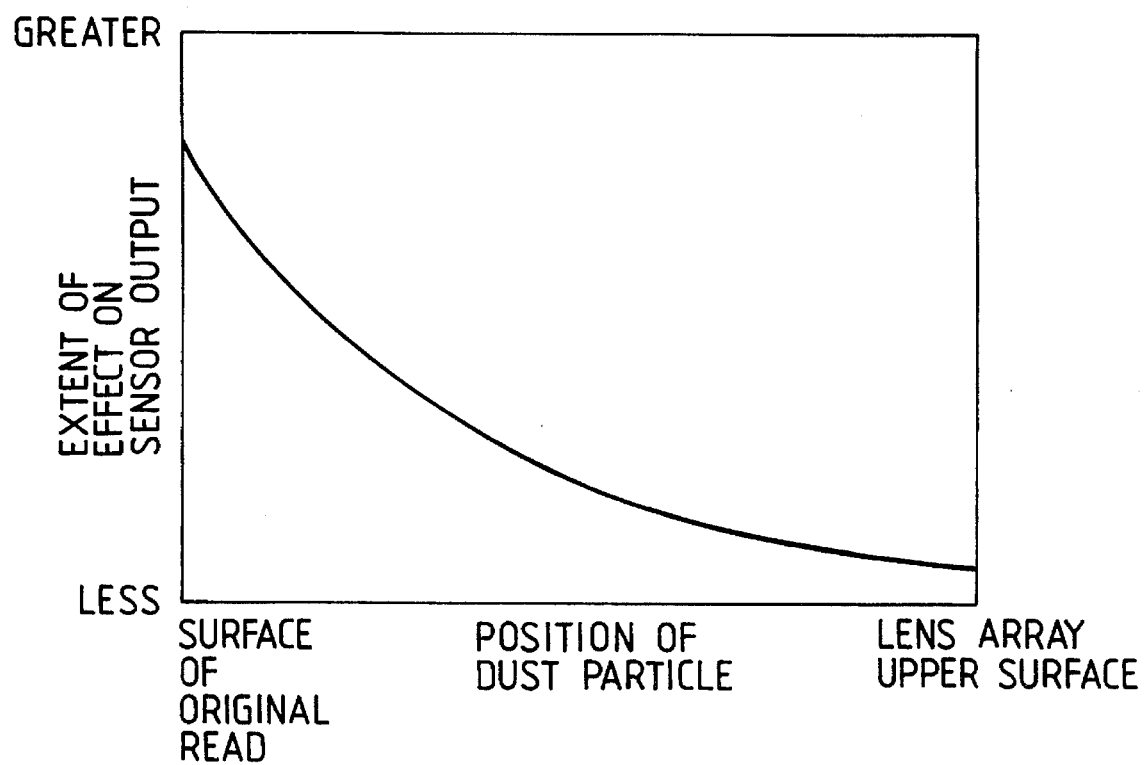
FIG. 12 is a graph showing the influence of dust particles on a sensor output.

FIG. 12 is a graph showing the relationship between the influence, on the sensor output, of dust particles on the optical axis of the lens array 7 on the rear surface of the transparent member 4, and the positions of dust particles. As can be seen from FIG. 12, as the positions of dust particles are separated away from the original surface to be read, the influence on the sensor output is reduced.

Therefore, with the arrangement of this embodiment, the positions of dust particles can be limited to a position between the lens array 7 and a sensor array 8 where dust particles less influence the sensor output. Also, the dust size level, which has been discussed as a conventional problem upon assembling, can be lowered, thus allowing easy assembling.

As shown in FIG. 11, the frame 1 is pre-formed with a support surface (reference surface) S for supporting a light output surface of the lens array 7 at a focal point position where the lens array 7 images the reflected light on the light-receiving portion of the sensor array 8. The light input surface of the lens array 7 is positioned by direct contact with the transparent member 4. For this reason, in this embodiment, the lens array need only be supported on the support surface S without performing any special focus adjustment operations in assembling, thereby easily fixing the lens array at the focal point position.

Note that the shape of the support surface S is not limited to that of this embodiment. That is, the support surface S may have any other structure as long as the lens array 7 can be fixed in the optical axis direction.

The focus adjustment free structure of this embodiment will be described below.

In FIG. 11, $d_1$ represents the thickness of the transparent member 4, and $d_2$ represents the distance from the reference surface of the lens array 7 to the reference surface of a sensor board 9.

Figure 13:
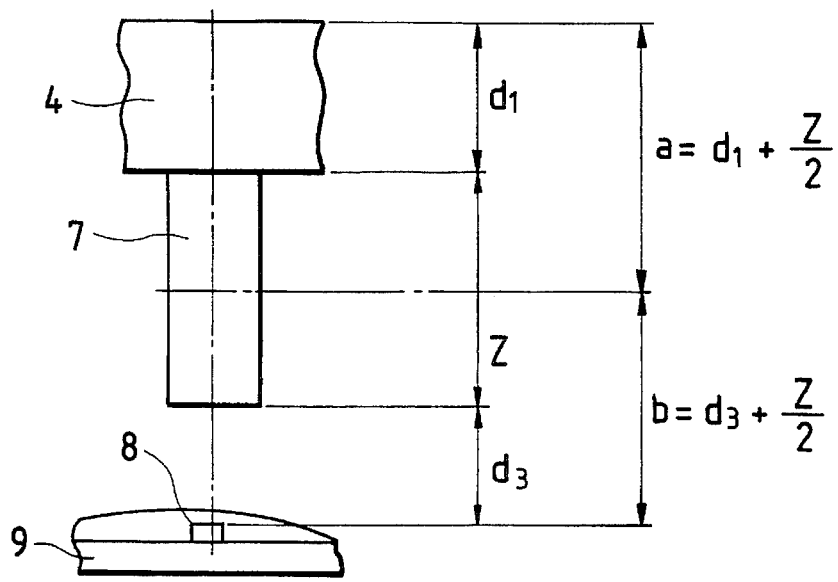
FIG. 13 is a schematic view for explaining a lens positioning method.

FIG. 13 is a view of an arrangement of components for explaining the focus adjustment free structure. In FIG. 13, $d_3$ represents the distance from the lower surface of the lens array 7 to the light-receiving portion of the sensor array 8, and z represents the height of the lens array 7.

If a conversion function when the optical length is represented by y with respect to an actual size x is defined as: y=f(x)
a and b in FIG. 13 are set to satisfy:
f(a)=f(b)
Assuming that the height of the lens array 7 becomes z+Δz, a and b are respectively given by:

$$a' = d_1 + \frac{z + \Delta z}{2} = a + \frac{\Delta z}{2}$$

$$b' = d_3 + \frac{z + \Delta z}{2} = b + \frac{\Delta z}{2}$$

Thus, a and b change by Δz/2. More specifically, when the height z of the lens array 7 is changed by Δz, the lens central position remains to be the center, and the focal length changes by Δz.

Figure 14:
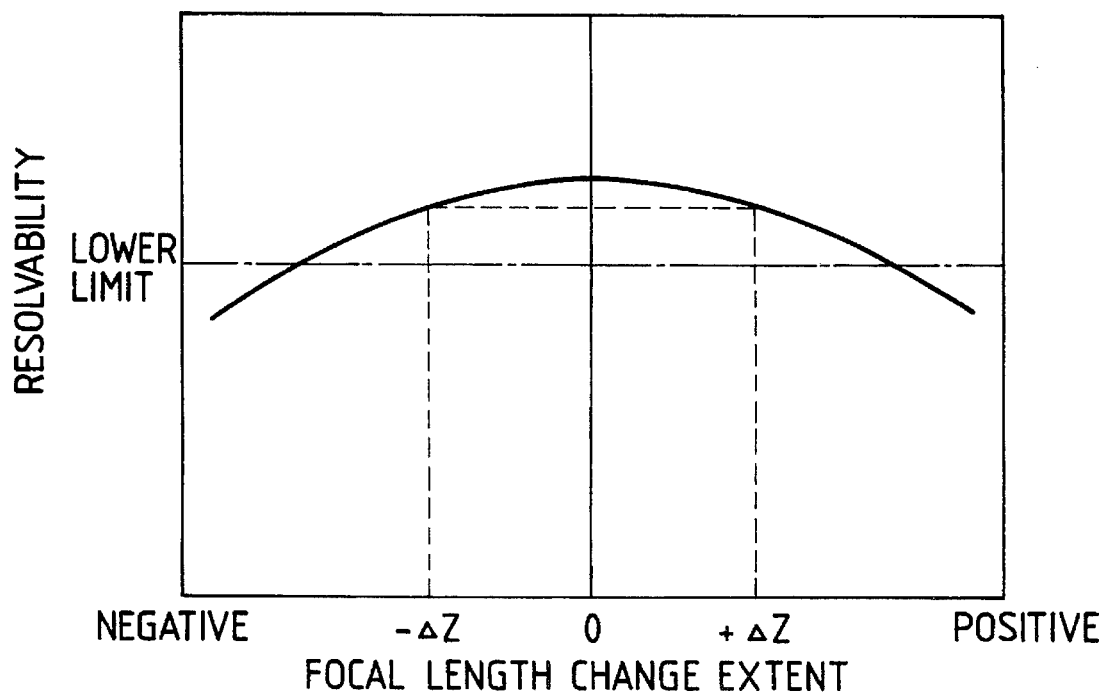
FIG. 14 is a graph showing the relationship between the focal length change extent and the resolvability.

FIG. 14 is a graph showing the relationship between the focal length change extent and the resolvability of the lens array 7. As can be seen from FIG. 14, since a decrease in resolvability in response to a change in focal length is slow, the resolvability of the lens array 7 is sufficiently applicable even when the change extent Δz of the height z of the lens array 7 is taken into consideration.

As described above, when a and b, i.e., $d_1$ and $d_3$ in FIG. 13 and $d_1$ and $d_2$ in FIG. 11 are properly maintained, the focus adjustment free structure of the lens array 7 can be realized, and easy assembling is allowed. In this embodiment, $d_1$ is determined by the thickness of the transparent member 4, and $d_3$ is determined by the position of the reference surface S.

The prior art requires a jig and the like to perform the focus adjustment of the lens array 7. However, with the arrangement of this embodiment, when the dimensions $d_1$ and $d_2$ in FIG. 11 are properly maintained, the focus adjustment free structure of the lens array 7 can be realized.

The above-mentioned effect of this embodiment may be obtained by forming the arrangement shown in FIG. 11 over the total length of the contact type image sensor or in one or a plurality of portions in the longitudinal direction.

(Second Embodiment)

Figure 15:
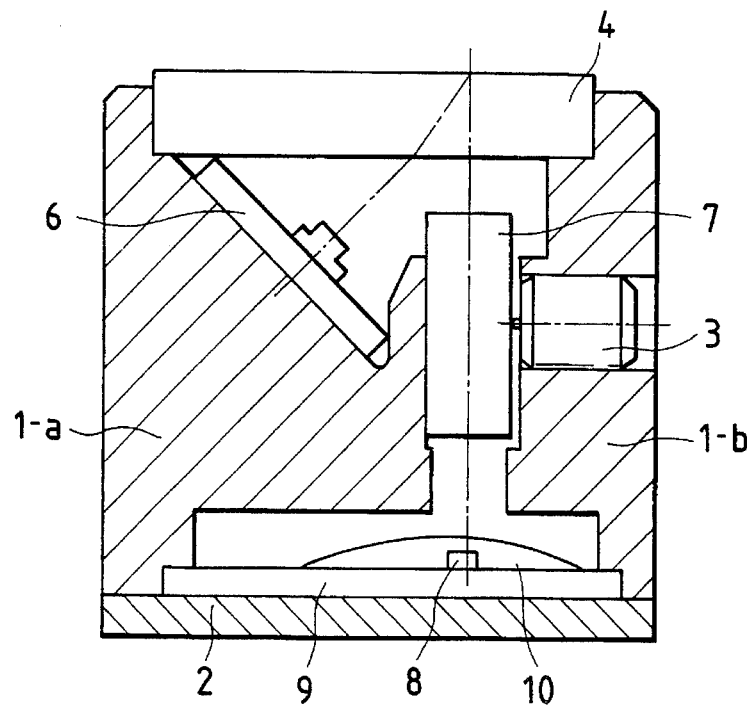
FIG. 15 is a sectional view showing a contact type image sensor according to the second embodiment of the present invention.

FIG. 15 shows the second embodiment of the present invention. In this embodiment, the light-emitting diode array 6 is clamped and supported between the first frame 1 as the support means and the transparent member 4.

With this arrangement, an adhesive, a double-sided tape, a screw, or the like for attaching the light-emitting diode array 6 can be omitted. Thus, generation of dust particles can be eliminated, and parts cost can be reduced.

The effect of this embodiment may be obtained by forming the arrangement of this embodiment over the total length of the contact type image sensor or in one or a plurality of portions in the longitudinal direction.

(Third Embodiment)

Of course, in order to obtain the effects of both the first and second embodiments, both the lens array 7 and the light-emitting diode light source 6 may be supported by the transparent member 4 and the frame 1 as the support means.

Figure 16:
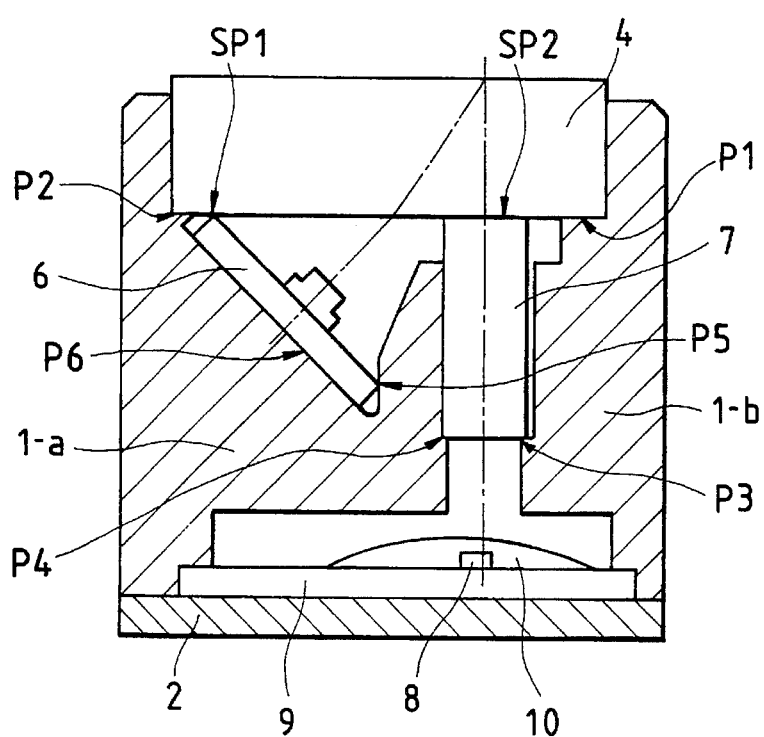
FIG. 16 is a sectional view showing a contact type image sensor according to the third embodiment of the present invention.

FIG. 16 is a sectional view showing a contact type image sensor according to the third embodiment.

The optical axis position of the lens array is determined by a contact portion SP2 with the transparent member 4 and contact portions P4 and P3 with frames 1-*a* and 1-*b*. Therefore, the distance between the light input surface of the lens array 7 and an original can always be kept constant (the thickness of the transparent member 4). Similarly, the distance between the light output surface of the lens array 7 and the light-receiving surface of the sensor array 8 can always be kept constant.

On the other hand, the position of the light source 6 is determined by contact portions SP1, P5, and P6.

The contact portions P1 and P2 between the transparent member 4 and the frames 1-a and 1-b may or may not be present, as shown in FIG. 16.

In general, in consideration of expansion/contraction errors of the lens array 7 and the frame, projections (P1 and P2) of the frame are designed so as not to be closer to the transparent member than the light input surface of the lens array. In other words, the lens array 7 alone and/or the light source 6 alone may contact the transparent member 4.

According to the first to third embodiments described above, deformation of the frame caused by a conventional screw fixing structure can be prevented, and hence, changes in outer dimensions can be prevented. Furthermore, since formation of gaps due to the deformation can be prevented, generation of stray light can be suppressed.

Since no space is present between the transparent member and the lens array, the conventional adverse effect of dust particles, entering this space, on the sensor output can be eliminated.

The lens array can be easily fixed at its focal point position by only supporting it on the support surface without any special focus adjustment operations in assembling. For this reason, the focus adjustment operations and a jig therefor, which are required in the prior art, can be omitted, thus allowing easy assembling.

Also, as a conventional method of attaching the light-emitting diode array as a light source for illuminating an original to the frame using an adhesive, a double-sided tape, a screw, or the like, means and time for holding the light-emitting diode array until the adhesive is hardened can be omitted; generation of dust particles from the end portions of the double-sided tape and attachment of dust particles to the end portions caused when the double-sided tape is used can be prevented; or the frame need not be worked to form a tap for receiving the screw, and an increase in parts cost due to the screw can be avoided.

In this manner, according to the first to third embodiments described above, deformation of the frame, and changes in outer dimensions and stray light caused by the deformation can be prevented, the influence of dust particles on the sensor output can be eliminated, the assembling processes can be simplified by omitting a focus adjustment operation in assembling, and cost can be reduced by decreasing the number of parts.

(Fourth Embodiment)

The preferred embodiments of the present invention will be described hereinafter. However, the present invention is not limited to these, and may adopt any other arrangements as long as the objects of the present invention are achieved.

Figure 17:
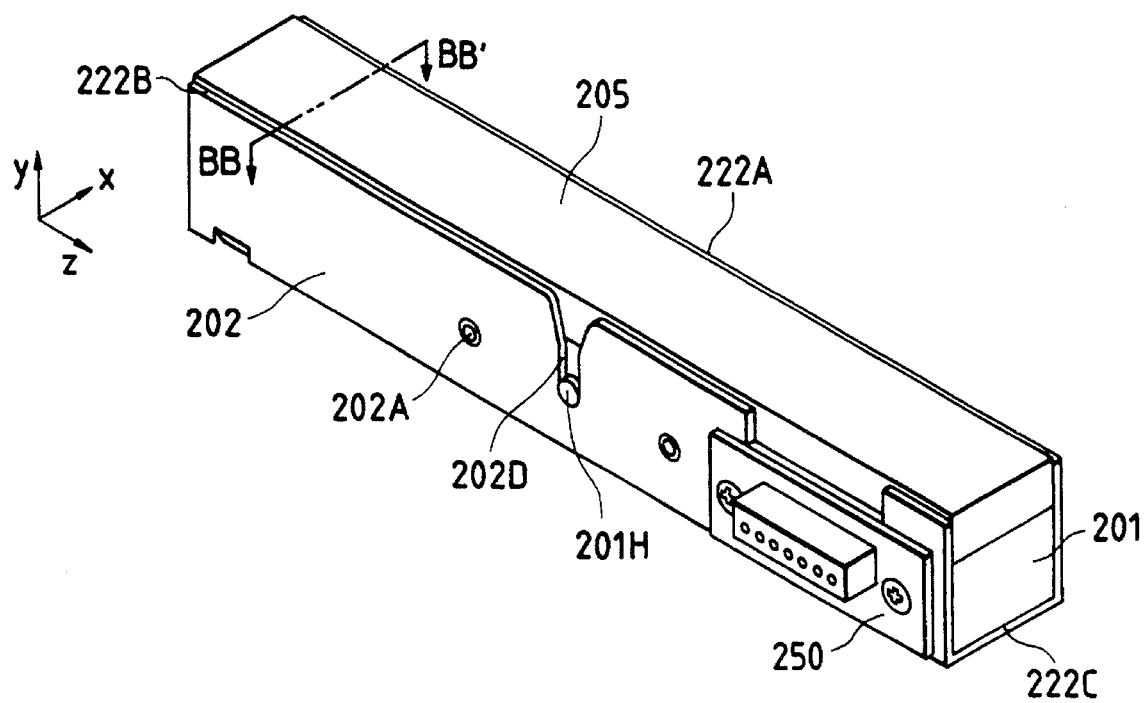
FIG. 17 is a perspective view showing a contact type image sensor according to the fourth embodiment of the present invention.
Figure 18:
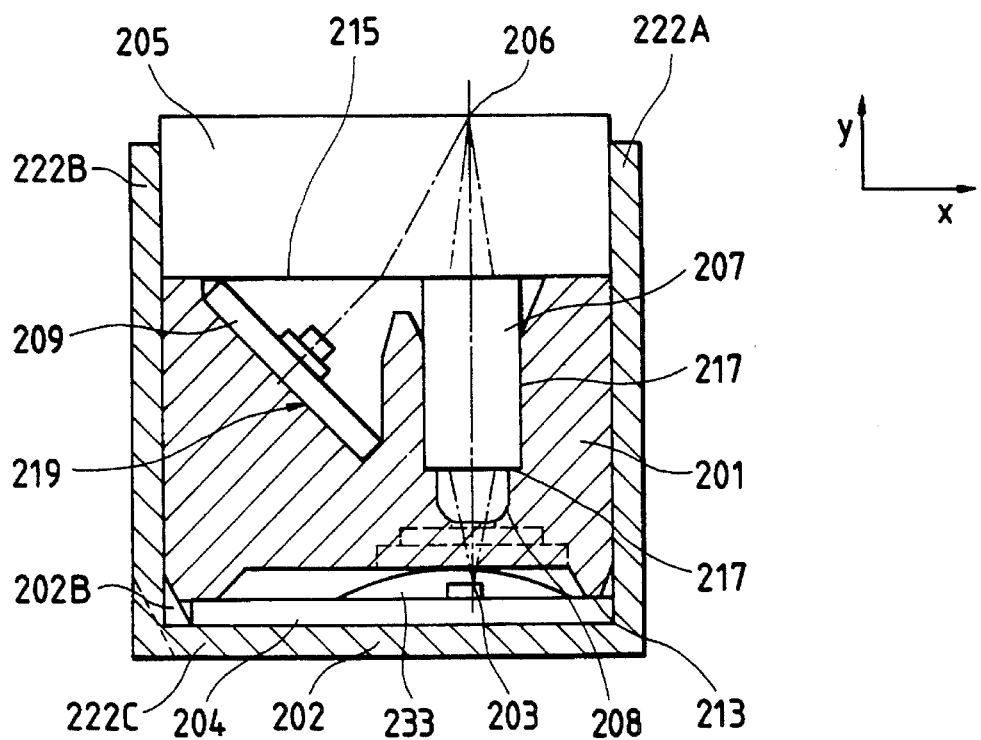
FIG. 18 is a sectional view taken along a line BB—BB' of the image sensor shown in FIG. 17.

FIG. 17 is a perspective view showing a contact type image sensor according to this embodiment, and FIG. 18 is a sectional view taken along a line BB—BB' in FIG. 17.

A first frame 201 as a support member consisting of a molded resin and having a satin-like surface is formed with positioning portions 213, 217, and 219 for arranging components, e.g., a sensor array 203 and a sensor board 204, a lens 207 as an imaging element, and a light source 209 at predetermined positions. The first frame 201 is clamped in the y-direction in FIG. 18 by a second frame 202 as another support member and a transparent member 205, thus determining the y-positions of the sensor array 203, the light source 209, and the lens 207. More specifically, the sensor array 203 is clamped between a bottom surface (crossing portion) 222C of the second frame 202 and the bottom surface 213 as the positioning portion of the first frame 201, the light source 209 is clamped between a rear surface 215 of the transparent member 205 and the positioning portion 219, and the lens 207 is clamped between the rear surface 215 of the transparent member and the positioning portion 217. The second frame 202 as the support member consists of worked aluminum having a U-shaped section. In the x-direction, two side surface portions 222A and 222B of the second frame 202 clamp the lens 207 via the first frame 201, thereby determining the position of the lens 207. The position of the board 204 of the sensor array 203 is also determined by the two side surface portions 222A and 222B of the second frame 202 and a positioning projection 202B of the first frame. Similarly, the transparent member 205 is held by the two side surface portions 222A and 222B of the second frame 202. Note that "positioning" has relative meanings as in action/reaction in the kinetics, and it should be noted that the following alternative expressions are allowed; "the transparent member 205 determines the position of the lens 207, while the transparent member 205 is positioned by the lens 207".

In this embodiment, since an LED lens array 209 and the lens 207 are in contact with the transparent member 205, movement of foreign matter into the optical path can be prevented, and the contact type image sensor can be assembled by easy works.

Figure 19:
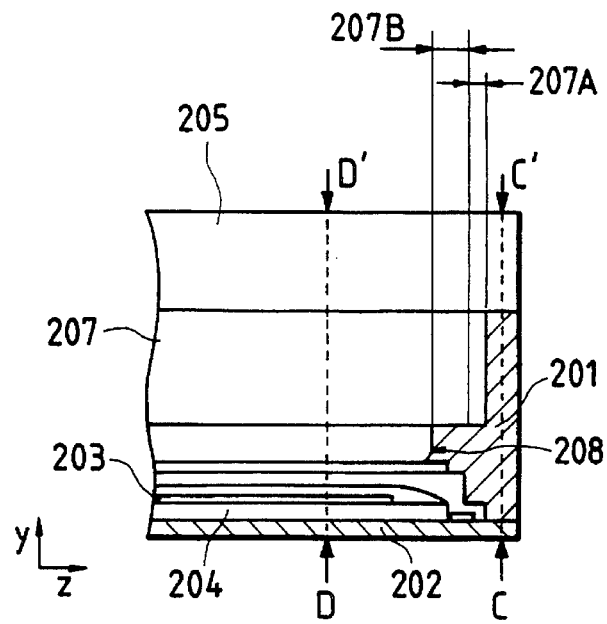
FIG. 19 is a partially longitudinal sectional view showing an arrangement of an end portion of the image sensor according to the fourth embodiment.
Figure 20:
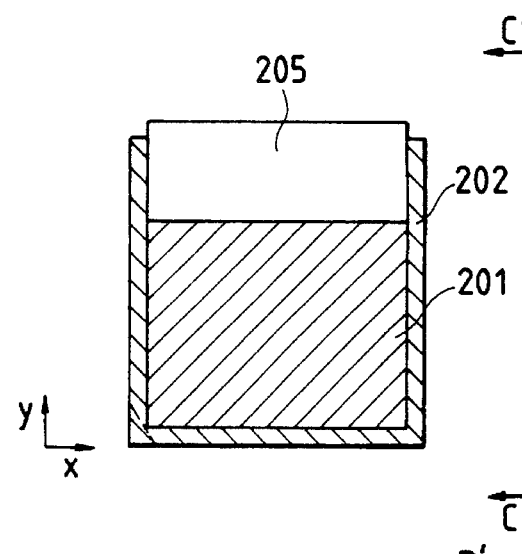
FIG. 20 is a sectional view taken along a line C—C' in FIG. 19.
Figure 21:
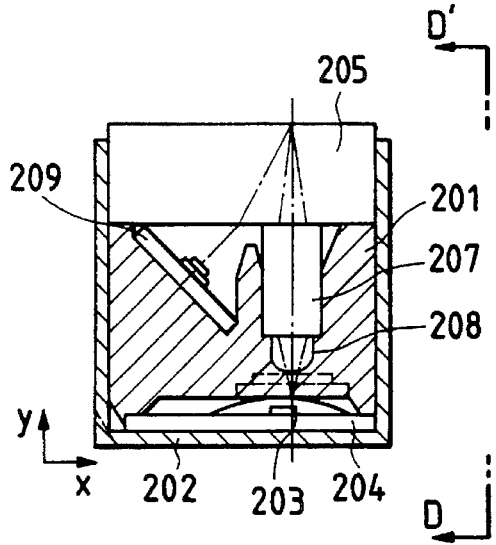
FIG. 21 is a sectional view taken along a line D—D' in FIG. 19.

The present invention uses, as the first frame 201, a member capable of providing a reference surface with high precision so as to position optical parts. In particular, a resin is preferably used since it can be relatively flexibly molded although it does not suffer from volume shrinkage. Since the resin allows parts molding with very high precision in simple processes by injection molding, it can be produced at low cost as compared to conventional A1 working. In addition, a structure having different sectional shapes of the end portions and the central portion, as shown in FIGS. 19 to 21, can be easily formed using a molded resin. Furthermore, since the frame itself can be colored in, e.g., black, brown, or the like, the frame also having a light-shielding function can be provided. Moreover, a satin-like surface (e.g., having a microminiature concave and convex surface) as a fine three-dimensional surface can be easily formed.

The present invention uses, as the second frame 202, a material having a rigidity larger than that of the first frame. More specifically, a rigid member consisting of a metal such as stainless steel, aluminum, copper, or the like is preferably used.

Deformation caused by thermal expansion due to a difference in materials combined as the first and second frames may pose a problem especially in the longitudinal direction of the image sensor. However, in this embodiment, since positioning in the longitudinal direction is achieved by a fitting structure at only the central portions of the first and second frames, the adverse effect due to deformation can be avoided.

Since the first frame and optical parts can be assembled from one direction using an opening portion of the second frame having the U-shaped section, assembling works can be simplified.

As the imaging element of the optical parts in the present invention, an element for imaging an erect image at an equal magnification is preferably used. However, the present invention is not limited to this. For example, various lenses, optical fibers, and the like may be used.

As the light source of the optical parts, a xenon discharging tube may be used in place of an LED array for emitting red, green, and yellow light components.

As the sensor array of the optical parts, an elongated optical sensor using amorphous silicon, as described in U.S. Pat. No. 4,461,956 (inventors: Hatanaka et al.), is preferable since it is inexpensive and has a high resolvability.

Also, an optical sensor in which a capacitive load is provided to the emitter of a bipolar transistor, and an output signal is read out from the emitter as a voltage, as disclosed in U.S. Pat. No. 4,791,469 (inventors: Ohmi et al.) and U.S. Pat. No. 4,810,896 (inventors: Tanaka et al.), is preferably used.

(Assembling Method)

Figure 22:
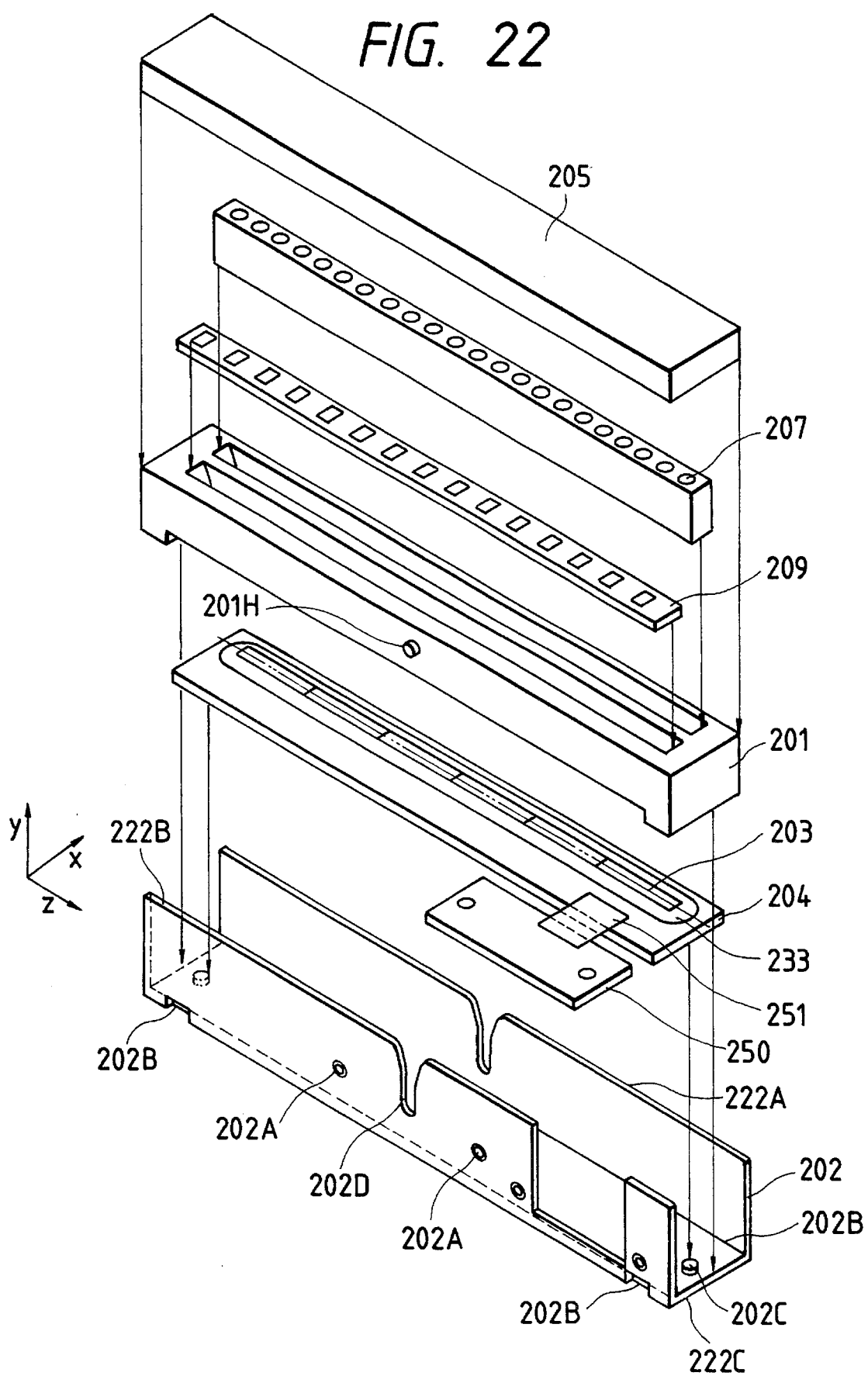
FIG. 22 is an exploded perspective view for explaining a method of assembling the image sensor of the fourth embodiment.

The above-mentioned image sensor is assembled, as shown in FIG. 22. First, the respective parts are prepared. For example, the second frame 202 has screw holes 202A as attaching means for attaching the image sensor to an apparatus main body, positioning projections 202B for positioning the sensor board 204 in the x-direction, positioning projections 202C for positioning the sensor board 204 in the z-direction, and positioning portions 202D for positioning the first frame 201 in the z-direction. These portions are formed by bending, drawing, and embossing a sheet metal.

The sensor board 204 is arranged on the bottom surface of the second frame 202. In this case, the sensor board 204 is positioned in the x- and z-directions by the positioning portions 202B and 202C. At this time, a connector 250 for exchanging signals with an external apparatus and an apparatus main body is connected to the sensor board 204 via a flexible wiring cable 251.

Then, the first frame 201 is fitted in a recess portion of the second frame 202. At this time, the first frame 201 is positioned in the z-direction by the grooves 202D formed in the central portion of the second frame, and projections 201H which can be fitted in the grooves. Also, the frame 201 is positioned in the x-direction by two side walls 222A and 222B of the second frame 202. The light source 209 and the lens 207 are then arranged at predetermined positions in the first frame 201. Finally, the glass plate 205 as the transparent member is fitted in the distal end portions of the two side wall portions of the second frame. In this manner, the light source 209, the lens 207, and the sensor array 203 of the first frame 201 are positioned in the y-direction.

The contact type image sensor assembled in this manner is fixed by screws to the main body of an image information processing apparatus (to be described later) by utilizing the attaching portions of the second frame 202.

Figure 23:
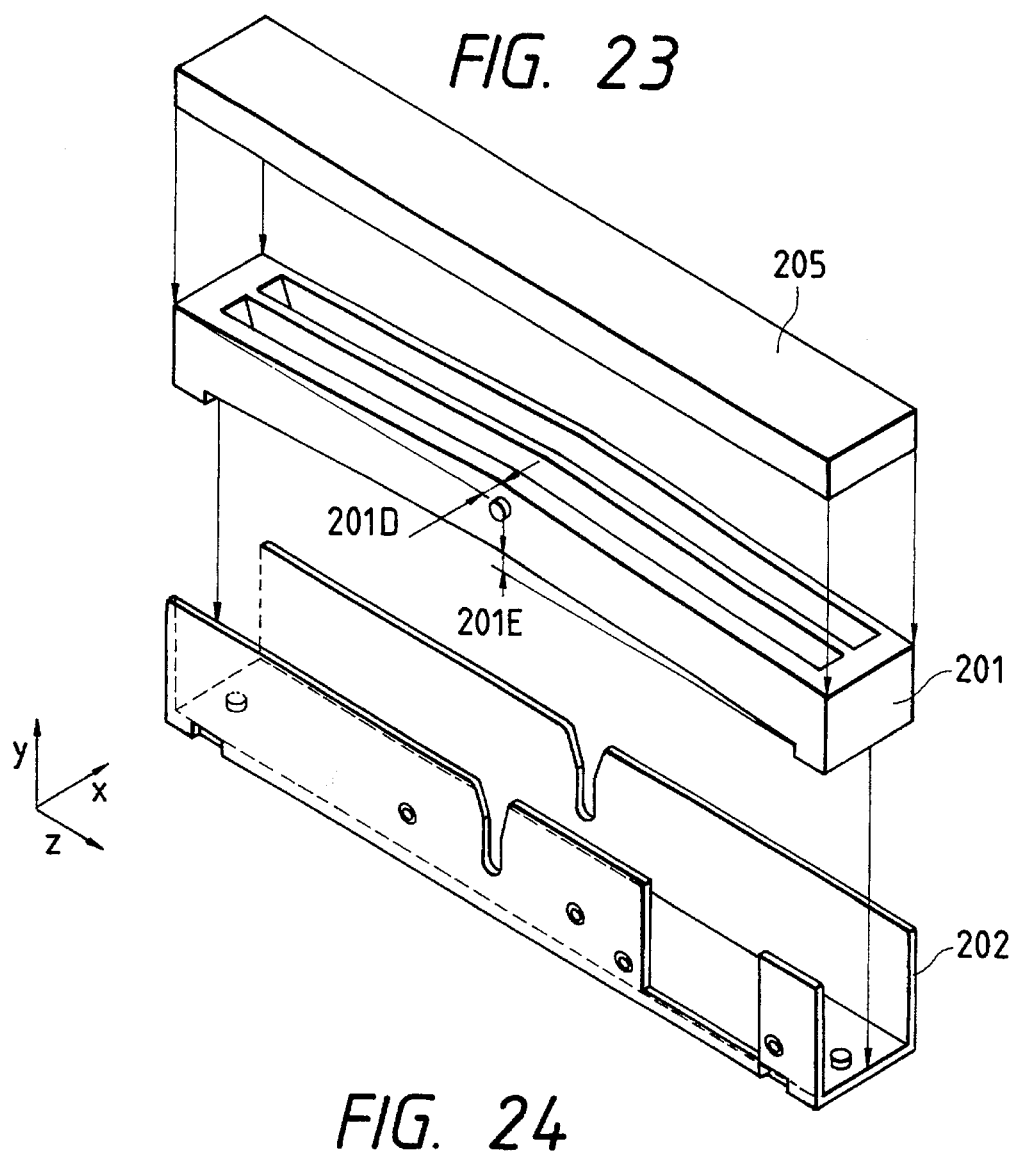
FIG. 23 is an exploded perspective view for explaining the method of assembling the image sensor of the fourth embodiment.
Figure 24:
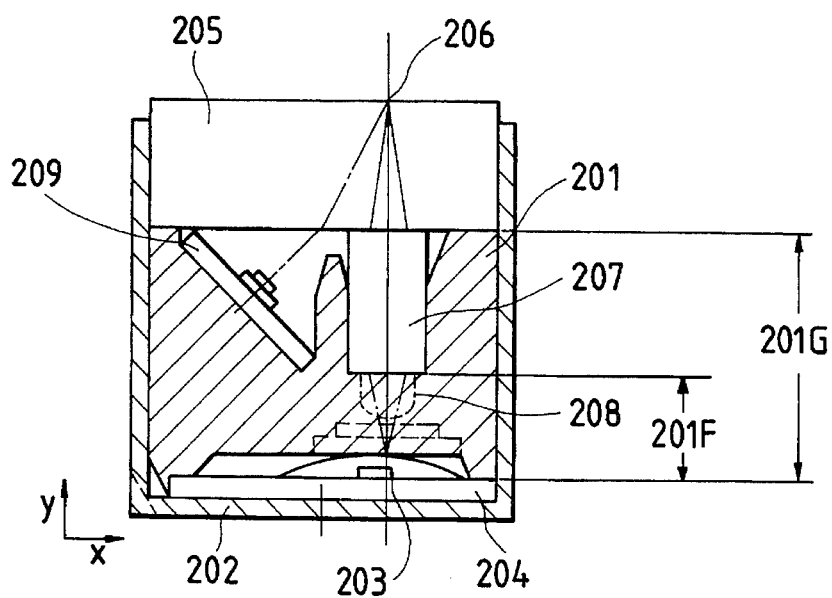
FIG. 24 is a sectional view for explaining the method of assembling the image sensor of the fourth embodiment.

The effects of this embodiment will be described below with reference to FIGS. 23, 24, and 25. FIG. 23 illustrates only the transparent member 205, the first frame 201, and the second frame 202.

The first frame 201 causes distortion such as warp 201D in the x-direction, warp 201E in the y-direction, and the like since it is formed using a material which is slightly deformed although it does not suffer from volume shrinkage. However, since the first frame 201 is fitted in the second frame 202 consisting of a material having a relatively large rigidity, such distortion is corrected, and the positions of the lens as the imaging element and the LED array as the light source can be correctly determined. As shown in FIG. 24, in optical positioning, a distance 201F between the sensor and the light output surface of the lens, and a distance 201G between the sensor and the light input surface of the lens are important.

Such dimensional precision is determined by the first frame 201.

Figure 25:
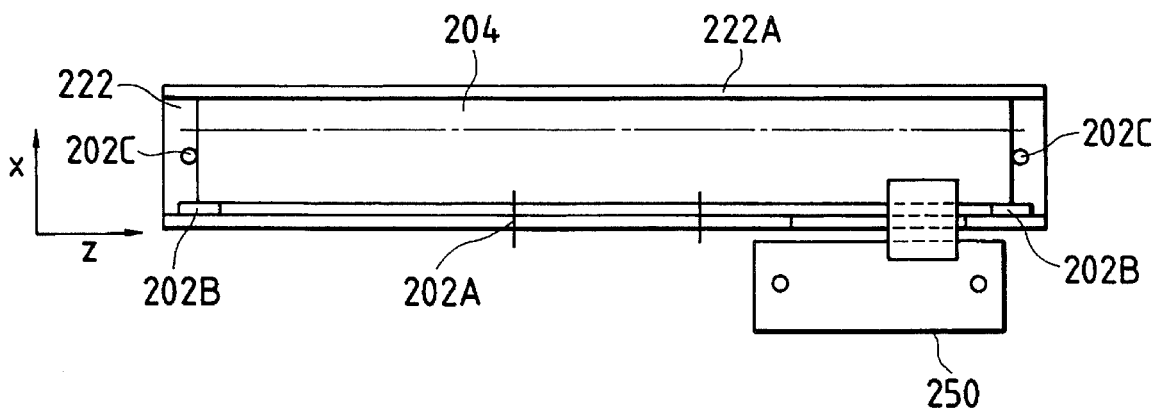
FIG. 25 is a plan view for explaining the method of assembling the image sensor of the fourth embodiment.

FIG. 25 shows a state wherein the sensor board 204 is positioned in the x–z plane in the second frame 202.

The second frame 202 determines the x-position of the sensor board 204 by the side wall portion 222A formed by bending a sheet metal, and the positioning portions 202B formed by drawing. On the other hand, the projections 202C, which are formed by embossing on the two end portions of the second frame 202, determine the z-position of the sensor board 204.

FIG. 19 is a sectional view showing an end portion of the image sensor of this embodiment, FIG. 20 is a sectional view taken along a line C—C' in FIG. 19, and FIG. 21 is a sectional view taken along a line D—D' in FIG. 19.

As can be seen from these figures, the outer surface shape of the first frame 201 is designed to be the same as the inner surface shape of the second frame 202 at the two end portions of the image sensor, thereby preventing formation of gaps, and preventing entrance of foreign matter and stray light.

Furthermore, in this embodiment, the length (z-direction) of a lens 207 storage portion of the first frame 201 is set to be larger than the length (z-direction) of the lens 207, thus forming a clearance 207A for absorbing an error of a device to be assembled. The length (z-direction) of a slit 208 is set to be smaller than the length of the lens 207, thus defining a length (z-direction) 207B of a tight contact portion between the lens 207 and the first frame. The clearance 207A is smaller than the length 207B. The length (z-direction) of the sensor array 203 is smaller than the length of the slit 208, and the length of the sensor board 204 is larger than the length of the slit 208. The end portions of the lens 207 outside the sensor array are designed not to transmit light, thus preventing entrance of stray light.

According to the fourth embodiment, since the support member having the first support member which allows relatively easy high-precision working for positioning, and the second support member having a high mechanical strength although high-precision working is relatively difficult, is used, the optical parts can be attached with high precision in simple works, and the contact type image sensor and an image information processing apparatus can be produced at low cost.

Figure 26:
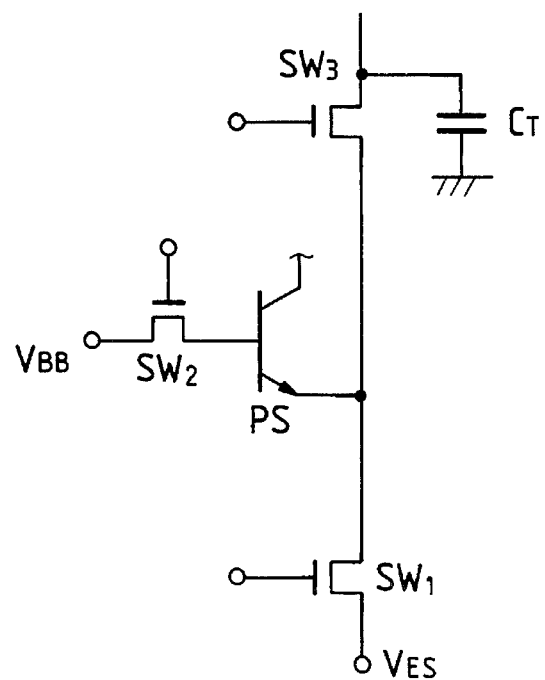
FIG. 26 is a circuit diagram for one pixel of the image sensor used in the present invention.

The image sensor used in the present invention described above will be described below. FIG. 26 is an equivalent circuit diagram corresponding to one pixel of the image sensor.

A circuit shown in FIG. 26 includes a bipolar transistor PS forming a pixel, an NMOS transistor $SW_1$ as a switch means, the emitter of which is connected to a reference voltage source $V_{ES}$, and which performs a reset operation, a PMOS transistor $SW_2$ as a switch means, the base of which is connected to a reference voltage source $V_{BB}$, and which performs a reset operation, an NMOS transistor $SW_3$ as a switch means for transferring a signal charge, and a capacitive load CT for generating a signal voltage. The operation of this circuit will be briefly described below.

<Reset Operation>

A negative pulse voltage is applied to the gate of the PMOS transistor $SW_2$, and the base of the transistor $SW_2$ is clamped at a voltage $V_{BB}$.

A positive pulse voltage is applied to the gate of the NMOS transistor $SW_1$, and the emitter of the transistor $SW_1$ is connected to the, voltage source $V_{ES}$. Thus, a current flows through the base-emitter path of the transistor $SW_1$, thus causing Light generation carriers remainfng on the base to disappear.

<Accumulation Operation>

Both the NMOS transistors $SW_1$ and $SW_3$ are turned off, and their emitters and bases are set in a floating state, thus starting the accumulation operation.

<Read Operation>

A positive pulse voltage is applied to the gate of the NMOS transistor $SW_3$, and the transistor $SW_3$ is turned on. The emitter of the transistor $SW_3$ is connected to the capacitive load CT, and a signal voltage is read out to the capacitive load CT.

The basic arrangement of such an image sensor is described as a high-sensitivity, low-noise charge-accumulation type photoelectric conversion device, in which the emitter of a bipolar transistor is connected to an output circuit including a capacitive load, in,. e.g., U.S. Pat. No. 4,686,554 (inventors: Ohmi and Tanaka).

In the above description, charge accumulation/amplification type image sensors using bipolar transistors have been described. The present invention can also be preferably applied to a sensor which includes a photodiode as a light-receiving portion, and transfers a signal charge using a MOS switch, a charge coupled device (CCD), or the like.

Figure 27:
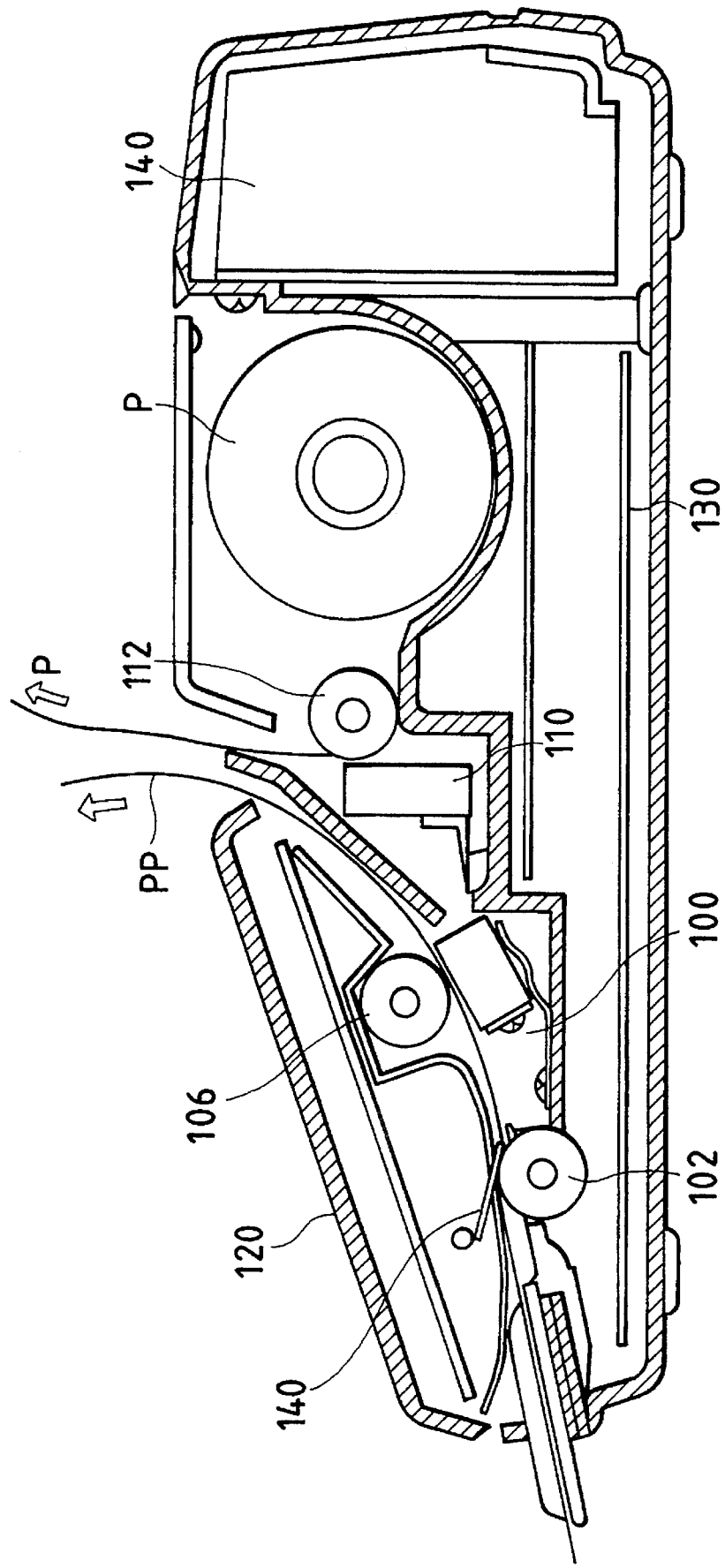
FIG. 27 is a sectional view showing an information processing apparatus using the image sensor according to the present invention.

FIG. 27 shows a facsimile apparatus having a communication function as an image information processing apparatus using a sensor unit according to the present invention, The facsimile apparatus includes a feed roller 102 for feeding an original PP toward a reading imposition, a separation piece 104 for separating and feedtng the original PP one by one, and a platen roller 106 as a convey means, provided at the reading position of the the sensor unit, for defining a surface to be read of the original PP, and conveying the original PP.

The apparatus also includes a recording medium P as a roll of paper, on which image information read by the sensor unit or transmitted from an external apparatus in the case of the facsimile apparatus is reproduced. The apparatus fursher includes a recording head 110 as a recording means for performing the image formation. As the recording head, various heads such as a thermal head, an ink-jet recording head, and the like may be used. Also, the recording head may be of either a serial type or line type. The apparatus includes a platen roller 112 as a convey means for conveying the recording medium P to the recording position of the recording head 110, and defining a surface to be subjected to recording of the recording medium P.

The apparatus includes an operation panel 120 provided with switches for accepting operation inputs, a display for informing messages and status of the apparatus, and the like as input/output means.

The apparatus includes a system control board 130 as a control means provided with a controller for controlling the respective units, a driver for a photoelectric conversion element, a processor for image information, a transmitter/receiver, and the like, and a power supply 140.

As to the representative construction and principle of the recording means used in the information processing apparatus of the present invention, for example, one practiced by use of the basic principle disclosed in, for instance, U.S. Pat. Nos. 4,723,129 and 4,740,796 is preferred. The above system is effective because, by applying at least one driving signal which gives rapid temperature elevation exceeding nucleus boiling corresponding to the recording information on electrothermal converting elements arranged in a range corresponding to the sheet or liquid channels holding liquid (ink), a heat energy is generated by the electrothermal converting elements to effect film boiling on the heat acting surface of the recording head, and consequently the bubbles within the liquid (ink) can be formed in correspondence to the driving signals one by one. By discharging the liquid (ink) through a discharge port by growth and shrinkage of the bubble, at least one droplet is formed.

Further, as a recording head of the full line type having a length corresponding to the maximum width of a recording medium which can be recorded by the recording device, either the construction which satisfies its length by a combination of a plurality of recording heads as disclosed in the above specifications or the construction as a single recording head which has integratedly been formed can be used.

In addition, the invention is effective for a recording head of the freely exchangeable chip type which enables electrical connection to the main device or supply of ink from the main device by being mounted onto the main device, or for the case by use of a recording head of the cartridge type provided integratedly on the recording head itself.

What is claimed is:

1. A contact type image sensor, comprising:

a transparent member which can contact an original to be read;

a light source for radiating light onto the original via said transparent member;

a sensor for receiving light reflected by the original;

an imaging element for imaging the reflected light on a light-receiving portion of said sensor; and support means for supporting said sensor, said imaging element, said transparent member, and said light source, wherein said imaging element and said light source are supported by said transparent member and said support means.

2. A sensor according to claim 1, wherein said transparent member and said imaging element are supported in a tight contact state without forming any gap therebetween.

3. A sensor according to claim 1, wherein said support means is pre-formed with a support surface for supporting said imaging element at a focal point position where said imaging element images the reflected light on said light-receiving portion of said sensor.

4. A sensor according to claim 1, wherein said sensor array has a circuit for reading out a signal to a capacitive load connected to an emitter of a bipolar transistor.

5. A sensor according to claim 1, wherein said sensor array has a photoelectric conversion layer consisting of amorphous silicon.

6. An information processing apparatus comprising:

a contact type image sensor comprising:

a transparent member which can contact an original to be read;

a light source for radiating light onto the original via said transparent member;

a sensor for receiving light reflected by the original;

an imaging element for imaging the reflected light on a light-receiving portion of said sensor; and support means for supporting said sensor, said imaging element, said transparent member, and said light source, wherein said imaging element and said light source are supported by said transparent member and said support means; and means for supporting an original on an original reading surface of said sensor.

7. An apparatus according to claim 6, further comprising means for reproducing the read image of the original.

8. A contact type image sensor, which comprises a support member for supporting a sensor array for performing photoelectric conversion, an imaging element for imaging light reflected by an original on said sensor array, a transparent member for defining a reading surface of the original, and a light source for illuminating the original, wherein said support member has a first support member having positioning portions for determining positions of said light source, said imaging element, and said sensor array, and a second support member having two opposing portions extending in a longitudinal direction of said support member, and a crossing portion crossing said opposing portions, said second support member clamping said imaging element by said opposing portions via said first support member, said first support member and said sensor array being clamped between said transparent member and said crossing portion, and said opposing portions clamp said transparent member.

9. A sensor according to claim 8, wherein said first support member has a colored microminiature concave and convex surface.

10. A sensor according to claim 8, wherein said second support member is provided with attaching portions for attaching said sensor to an apparatus main body, and positioning portions for positioning said first support member.

11. A sensor according to claim 8, wherein outer surfaces of two end portions of said first support member in a longitudinal direction have substantially same shapes as inner surfaces of two end portions of said second support member in a longitudinal direction.

12. A sensor according to claim 8, wherein said sensor array has a circuit for reading out a signal to a capacitive load connected to an emitter of a bipolar transistor.

13. A sensor according to claim 8, wherein said sensor array has a photoelectric conversion layer consisting of amorphous silicon.

14. A sensor according to claim 8, wherein said imaging element and said light source are adjacent to said transparent member, and supported by said transparent member and said supporting member.

15. A contact type image sensor comprising:

a support member for supporting a sensor array for performing photoelectric conversion;

an imaging element for imaging light reflected by an original on said sensor array;

a transparent member for defining a reading surface of the original; and a light source for illuminating the original, wherein said support member has a first support member having positioning portions for determining positions of said light source, said imaging element, and said sensor array, and a second support member having two opposing portions extending in a longitudinal direction of said support member, and a crossing portion crossing said opposing portions, said second support member clamping said imaging element by said opposing portions via said first support member, said first support member and said sensor array being clamped between said transparent member and said crossing portion, and wherein said first and second support members allow assembling of said first support member to said second support member from only one direction with respect to said second support member.

16. An information processing apparatus comprising an image sensor according to claim 15, and means for conveying an original into a reading position of said sensor.

17. An information processing apparatus comprising an image sensor according to claim 15, wherein said second support member of said sensor is provided with a mount section for mounting an apparatus body thereon, and said sensor is mounted on said body through said mount section.

18. A sensor according to claim 15, wherein said imaging element and said light source are adjacent to said transparent member, and supported by said transparent member and said supporting member.

19. A contact type image sensor comprising:

a support member for supporting a sensor array for performing photoelectric conversion;

an imaging element for imaging light reflected by an original on said sensor array;

a transparent member for defining a reading surface of the original; and a light source for illuminating the original, wherein said support member has a first support member having positioning portions for determining positions of said light source, said imaging element, and said sensor array, and a second support member having two opposing portions extending in a longitudinal direction of said support member, and a crossing portion crossing said opposing portions, said second support member clamping said imaging element by said opposing portions via said first support member, said first support member and said sensor array being clamped between said transparent member and said crossing portion, and wherein said second support member has a U-shaped section and a positioning groove or projection on at least one of said opposing portions, and said first support member is provided with a projection or a groove to be fitted with said groove or projection of said second support member.

20. A sensor according to claim 19, wherein said U-shaped section comprises said opposing portion and said crossing portion.

21. An information processing apparatus comprising an image sensor according to claim 19, and means for conveying an original into a reading position of said sensor.

22. An information processing apparatus comprising an image sensor according to claim 19, wherein said second support member of said sensor is provided with a mount section for mounting an apparatus body thereon, and said sensor is mounted on said body through said mount section.

23. A sensor according to claim 19, wherein said imaging element and said light source are adjacent to said transparent member, and supported by said transparent member and said supporting member.

24. An image information processing apparatus having a contact type image sensor which comprises a support member for supporting a sensor array for performing photoelectric conversion, an imaging element for imaging light reflected by an original on said sensor array, a transparent member for defining a reading surface of the original, and a light source for illuminating the original, and in which said support member has a first support member having positioning portions for determining positions of said light source, said imaging element, and said sensor array, and a second support member having two opposing portions extending in a longitudinal direction of said support member, and a crossing portion crossing said opposing portions, said second support member clamping said imaging element by said opposing portions via said first support member, said first support member and said sensor array being clamped between said transparent member and said crossing portion and said opposing portions clamp said transparent member, wherein attaching portions are provided to said second support member, and said sensor is attached to an apparatus main body by said attaching portions.

25. An apparatus according to claim 24, further comprising a recording head for recording an image.

26. An apparatus according to claim 25, wherein said recording head is an ink-jet recording head for ejecting an ink by utilizing heat energy.

27. A method of producing a contact type image sensor which comprises a support member for supporting a sensor array for performing photoelectric conversion, an imaging element for imaging light reflected by an original on said sensor array, a transparent member for defining a reading surface of the original, and a light source for illuminating the original, comprising the steps of:

fitting a first support member having positioning portions for determining positions of said light source, said imaging element, and said sensor array in a second support member having two opposing portions extending in a longitudinal direction of said second support member, and a crossing portion crossing said opposing portions;

attaching said light source and said imaging element to said first support member fitted in said second support member; and arranging and fixing said transparent member on said light source and said imaging element attached to said first support member.

* * * * *

UNITED STATES PATENT AND TRADEMARK OFFICE
CERTIFICATE OF CORRECTION

PATENT NO. : 5,489,995

DATED : February 6, 1996

INVENTOR(S) : TOSHIMITSU ISO ET AL.

It is certified that error appears in the above-identified patent and that said Letters Patent is hereby corrected as shown below:

COLUMN 11

Line 10, "the-emitter" should read --the emitter--.

COLUMN 13

Line 1, "the," should read --the--.
    Line 3, "Light" should read --light--.
    Line 35, "imposition," should read --position,--.
    Line 44, "fursher" should read --further--.

Signed and Sealed this

Twenty-seventh Day of August, 1996

Attest:

BRUCE LEHMAN

*Attesting Officer*      *Commissioner of Patents and Trademarks*